United States Patent
Huber et al.

(10) Patent No.: US 11,479,106 B2
(45) Date of Patent: Oct. 25, 2022

(54) HYBRID MODULE FOR A DRIVE TRAIN OF A MOTOR VEHICLE, HYBRID UNIT AND METHOD FOR ASSEMBLING A HYBRID MODULE

(71) Applicant: Schaeffler Technologies AG & Co. KG, Herzogenaurach (DE)

(72) Inventors: Lionel Huber, Drusenheim (FR); Steffen Lehmann, Ettlingen (DE); Simon Ortmann, Bühl (DE); Christian Dinger, Achern (DE); Benjamin Vögtle, Karlsruhe (DE); Dirk Hofstetter, Durmersheim (DE); Anton Simonov, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 284 days.

(21) Appl. No.: 16/620,358

(22) PCT Filed: May 16, 2018

(86) PCT No.: PCT/DE2018/100464
§ 371 (c)(1),
(2) Date: Dec. 6, 2019

(87) PCT Pub. No.: WO2018/228638
PCT Pub. Date: Dec. 20, 2018

(65) Prior Publication Data
US 2020/0101831 A1 Apr. 2, 2020

(30) Foreign Application Priority Data

Jun. 16, 2017 (DE) .................... 10 2017 113 242.2
Nov. 17, 2017 (DE) .................... 10 2017 127 102.3

(51) Int. Cl.
*B60K 6/38* (2007.10)
*B60K 6/24* (2007.10)
(Continued)

(52) U.S. Cl.
CPC ............... *B60K 6/387* (2013.01); *B60K 6/24* (2013.01); *B60K 6/48* (2013.01); *B60K 25/00* (2013.01);
(Continued)

(58) Field of Classification Search
CPC . B60K 6/387; B60K 6/24; B60K 6/48; B60K 25/00; B60K 6/405;
(Continued)

(56) References Cited

U.S. PATENT DOCUMENTS

| 6,474,428 B1 * | 11/2002 | Fujikawa | ............... B60K 6/365 903/952 |
| 6,561,336 B1 * | 5/2003 | Huart | ..................... F02N 11/04 192/85.49 |

FOREIGN PATENT DOCUMENTS

| CN | 105392655 A | 3/2016 |
| EP | 1886860 A1 | 2/2008 |

(Continued)

*Primary Examiner* — Colby M Hansen

(57) ABSTRACT

A hybrid module includes a first, motor-side pre-assembly group and a second, transmission-side pre-assembly group. A separating clutch is arranged between the motor-side pre-assembly group and the transmission-side pre-assembly group, via which the pre-assembly groups can be connected in a torque-transmitting manner.

7 Claims, 6 Drawing Sheets

(51) Int. Cl.
  *B60K 25/00*    (2006.01)
  *H02K 5/24*     (2006.01)
  *H02K 7/08*     (2006.01)
  *B60K 6/48*     (2007.10)
  *B60K 6/387*    (2007.10)
  *H02K 7/00*     (2006.01)
  *H02K 7/108*    (2006.01)
  *B60K 6/405*    (2007.10)
  *F16D 25/063*   (2006.01)

(52) U.S. Cl.
  CPC ............... *H02K 5/24* (2013.01); *H02K 7/006* (2013.01); *H02K 7/08* (2013.01); *H02K 7/108* (2013.01); *B60K 6/405* (2013.01); *B60K 2025/005* (2013.01); *B60Y 2200/92* (2013.01); *F16D 25/063* (2013.01); *Y02T 10/62* (2013.01)

(58) Field of Classification Search
  CPC .... B60K 2025/005; H02K 5/24; H02K 7/006; H02K 7/08; H02K 7/108; F16D 25/063; Y02T 10/62
  See application file for complete search history.

(56) References Cited

FOREIGN PATENT DOCUMENTS

| | | |
|---|---|---|
| FR | 2871111 A1 | 12/2005 |
| JP | 2000304065 A | 10/2000 |
| WO | 2008064813 A2 | 6/2008 |
| WO | 2014026685 A1 | 2/2014 |

* cited by examiner

HYBRID MODULE FOR A DRIVE TRAIN OF A MOTOR VEHICLE, HYBRID UNIT AND METHOD FOR ASSEMBLING A HYBRID MODULE

CROSS-REFERENCE TO RELATED APPLICATIONS

This application is the U.S. National Phase of PCT Appln. No. PCT/DE2018/100464 filed May 16, 2018, which claims priority to DE 10 2017 113 242.2 filed Jun. 16, 2017 and DE 10 2017 127 102.3 filed Nov. 17, 2017, the entire disclosures of which are incorporated by reference herein.

TECHNICAL FIELD

The disclosure relates to a hybrid module for a drive train of a motor vehicle, to a hybrid unit having the hybrid module according to the disclosure, and to a method for assembling a hybrid module according to the disclosure.

BACKGROUND

Hybrid modules having an electric machine arranged in an axially parallel configuration between an internal combustion engine and a transmission are known per se from the general prior art.

Precisely with axially parallel hybrid systems, there is the problem that the installation space must be used even more efficiently than previously. Nevertheless, it is desirable that a module should be flanged between the transmission and the internal combustion engine and that it should be possible to use it for a very wide variety of engine/transmission combinations.

SUMMARY

Proceeding on this basis, it is the underlying object of the present disclosure to avoid or even completely eliminate the disadvantages of the prior art and, especially for axially parallel hybrid systems, to present a module of universal application which makes better use of the installation space, especially in the axial direction, and simplifies assembly.

According to the disclosure, this object is achieved by a hybrid module and a hybrid unit having the hybrid module according to the embodiments disclosed herein.

Advantageous embodiments of the hybrid module according to the disclosure are described in the claims.

The features in the claims can be combined in any technically feasible way and, to this end, the explanations from the following description and the features from the figures, which include supplementary embodiments of the disclosure, can also be referred to.

In general terms, the disclosure relates to a hybrid module having a first, motor-side pre-assembly group and a second, transmission-side pre-assembly group, wherein a separating clutch is arranged between the motor-side pre-assembly group and the transmission-side pre-assembly group, via which the pre-assembly groups can be connected in a torque-transmitting manner.

According to an embodiment, the hybrid module has a motor-side pre-assembly group and a transmission-side second pre-assembly group, wherein the motor-side pre-assembly group can be connected to the motor-side output shaft of a drive motor, preferably an internal combustion engine, and the transmission-side pre-assembly group can be connected to a transmission-side drive shaft. The pre-assembly groups can be connected on the motor or transmission side via axial joints, in particular via screw joints or axial splines, for the transmission of a torque. A separating clutch is arranged between the motor-side pre-assembly group and the transmission-side pre-assembly group, via which the pre-assembly groups can be connected in a torque-transmitting manner. The motor-side pre-assembly group is formed by at least one torsional vibration absorber and one first disk cage.

It is advantageous to embody the separating clutch as a multi-disk clutch. The multi-disk clutch preferably has a first disk cage, which is assigned to the motor-side pre-assembly group, and a second disk cage, which is assigned to the transmission-side pre-assembly group. In this way, rapid and simple positioning of the pre-assembly groups relative to one another can be made possible.

In particular, it is advantageous to embody the motor-side disk cage as an outer disk cage and the transmission-side disk cage as an inner disk cage, thereby, on the one hand, making available sufficient radial installation space for the arrangement of a central release mechanism between the separating clutch and the transmission-side drive shaft and, on the other hand, allowing optimum use to be made of the available axial installation space. Simple assembly of the module is also made possible by this means.

In an advantageous embodiment, the transmission-side pre-assembly group has a disk cage which is mounted on a support bearing on the housing side and can be connected directly to the transmission-side drive shaft.

In another advantageous embodiment, the transmission-side pre-assembly group has a disk cage having a wheel, wherein the connection of the electric machine to the drive train can be accomplished via the wheel.

In another advantageous embodiment, it is also possible for an air-conditioning compressor to be connected to the electric machine in parallel with the hybrid module. This has the advantage that an air-conditioning system can be operated even when the internal combustion engine is not running at that particular time.

In another advantageous embodiment, the sealing of the motor-side pre-assembly group is accomplished by means of a sealing plate centered on the crankcase and by means of a sealing ring. The sealing ring is arranged between the sealing plate and the primary side of the dual mass flywheel in such a way that the sealing lips rub on the primary side. The sealing plate and the sealing ring can also be regarded as a further pre-assembly group.

It is another object of the disclosure to specify a method for assembling a hybrid module according to the disclosure.

In this method, the following are made available:
- a first pre-assembly group comprising a sealing plate and a sealing ring,
- a second, motor-side pre-assembly group having at least one torsional vibration absorber and one first disk cage, and
- a third, transmission-side pre-assembly group having a disk pack, a second disk cage, a wheel, a central release mechanism and a module housing, wherein, in the case of assembly, the first pre-assembly group is first of all centered on the crankcase, the second pre-assembly group is then connected to the output shaft of the drive motor and, in the final step, the third pre-assembly group is mounted axially on the second pre-assembly group and connected to the first pre-assembly group.

This means that, in a first step, the pre-assembly group comprising the sealing plate and the sealing ring is mounted on the motor side and centered on the crankcase. In a second step, the motor-side pre-assembly group is connected to the output shaft of the drive motor. In a third step, the transmission-side pre-assembly group is connected to the sealing plate and the crankcase, or to the motor-side pre-assembly group.

Once the modules have been assembled, the required quantity of lubricating oil can be introduced into the hybrid module. Moreover, the flexible transmission can be installed, and the electric motor can be arranged in the periphery of the hybrid module and connected to the flexible transmission. Furthermore, an air-conditioning compressor can be installed and likewise connected by a flexible transmission to the hybrid module.

The teaching according to the disclosure relating to the hybrid module provides the following:

A hybrid module having a first, motor-side pre-assembly group and a second, transmission-side pre-assembly group is made available, wherein a separating clutch is arranged between the motor-side pre-assembly group and the transmission-side pre-assembly group, via which the pre-assembly groups can be connected in a torque-transmitting manner.

Provision is advantageously made for the motor-side pre-assembly group to comprise at least one torsional vibration absorber and one first disk cage.

The transmission-side pre-assembly group preferably comprises at least a disk pack, a second disk cage, a wheel, a central release mechanism and a module housing. In this case, the wheel is embodied, in particular, as a chain sprocket or belt pulley of a flexible transmission in order in this way to be able to input a torque into the second disk cage from an externally arranged electric machine via the flexible transmission.

In particular, the separating clutch may be embodied as a multi-disk clutch.

In this embodiment, the motor-side first disk cage should be embodied as an outer disk cage, and the transmission-side second disk cage should be embodied as an inner disk cage.

In another advantageous embodiment, the hybrid module has a support bearing, and the second disk cage is mounted on the support bearing on the housing side and can be connected directly to a transmission-side drive shaft for conjoint rotation therewith. Here, the support bearing supports the radially outer side of the second disk cage. In this case, the support bearing is arranged on a radially inner side of a housing. The connection of the second disk cage to the drive shaft for conjoint rotation therewith is preferably accomplished by means of splines.

In another advantageous embodiment of the hybrid module, the transmission-side second disk cage has the wheel by which the connection of an electric machine to the drive train can be achieved. This means that the wheel is preferably an integral part of the second disk cage.

Owing to the fact that the second disk cage is preferably supported by the support bearing on a housing of the hybrid module, the wheel for the flexible transmission is thus also supported indirectly on the housing. In this case, the second disk cage is configured in such a way that it can be mounted in positive engagement for conjoint rotation on an output shaft, which can be the input shaft of a transmission or, alternatively, of a converter, for example. Consequently, a torque introduced into the wheel at the second disk cage is transmitted directly to the output shaft via the second disk cage.

The module housing is preferably configured in such a way that it comprises a radially inner housing part and a radially outer housing part, which are connected to one another mechanically, in particular by means of a plurality of screwed joints, wherein the radially inner housing part is supported on the radial inside thereof on the support bearing, and the radially outer housing part is designed to be connected by means of at least one mechanical connection, in particular a screw joint, to an external device, e.g. a crankcase of the internal combustion engine.

In this case, the mechanical connection of the radially inner housing part and of the radially outer housing part is accomplished on the radially outer side of the radially inner housing part and on the radially inner side of the radially outer housing part. The mechanical connection for fixing the radially outer housing part is preferably likewise a screwed joint.

The division of the housing into two housing parts allows optimum use of the installation space and flexible assembly.

The radially inner housing part is preferably produced from a steel, and the radially outer housing part is preferably produced from a cast aluminum material. The advantage of steel as a material for the radially inner housing part is the higher temperature stability based on friction-related heating of the support bearing connected to the radially inner housing part. The advantage of a cast aluminum material for the radially outer housing part is the lower weight as compared with steel. A seal element, preferably a first O-ring, is provided between the radially inner housing part and the radially outer housing part for the purpose of sealing.

Provision is furthermore preferably made for the radially outer housing part and the radially inner housing part to form at least one flow duct, through which a fluid of a clutch actuating device included by the hybrid module, in particular a central release mechanism, can be fed for the purpose of actuating same.

This flow duct is preferably provided between mechanical fastening devices for the mechanical fastening of the two housing parts. A bushing is preferably arranged in a transverse hole in the region of the transition between the outer housing part and the inner housing part in order to ensure sealing. This bushing can additionally be sealed with respect to the radially outer housing part by a second O-ring, wherein this second O-ring can be arranged in such a way that it also provides a sealing action relative to the radially inner housing part.

To simplify the production of the radially inner housing part or of its section of the flow duct, it is envisaged that the flow duct emerges at the radially outer side of the housing part in the inner housing part and is closed there by a plug, optionally likewise made of steel. By virtue of its elastic restoring force achieved in the closed state, this plug has a sealing effect in the radially outer region of the flow duct in the radially inner housing part.

Another aspect of the disclosure is a hybrid unit comprising a hybrid module according to the disclosure and an electric machine axially parallel to the axis of rotation of the hybrid module, and an air-conditioning compressor, which is connected mechanically to the electric machine. The electric machine is connected via a flexible transmission to the wheel of the second disk cage substantially for conjoint rotation therewith.

In this way, the radial tolerance chain relative to the chain sprocket can be reduced and, accordingly, smoothness of running can be improved, wherein the support bearing is of sufficiently stable configuration to withstand the loading introduced by the flexible transmission and/or the separating clutch.

The mechanical connection between the electric machine and the air conditioning compressor is preferably likewise implemented by means of a flexible transmission, thus enabling a torque applied to the electric machine or supplied by the latter to be transmitted to the air-conditioning compressor.

The hybrid unit can furthermore comprise an internal combustion engine, which has a crankcase, and a sealing plate that is centered on the crankcase and has a sealing ring is provided for the motor-side sealing of the hybrid module.

The method according to the disclosure for assembling a hybrid module comprises the following steps:

- a first pre-assembly group comprising at least a sealing plate and a sealing ring is made available,
- a second, motor-side pre-assembly group having at least one torsional vibration absorber and one first disk cage is made available, and
- a third, transmission-side pre-assembly group having a disk pack, a second disk cage, a wheel, a central release mechanism and a module housing is made available, wherein, in the case of assembly, the first pre-assembly group is first of all centered on the crankcase, the second pre-assembly group is then connected to the output shaft of the drive motor and, in the final step, the third pre-assembly group is mounted axially on the second pre-assembly group and connected to the first pre-assembly group.

BRIEF DESCRIPTION OF THE DRAWINGS

The disclosure described above is explained in detail below in relation to the relevant technical background, with reference to the associated drawings, which show preferred embodiments. The disclosure is not in any way restricted by the purely schematic drawings, and it should be noted that the illustrative embodiments shown in the drawings are not restricted to the dimensions illustrated. In the drawings

DETAILED DESCRIPTION

Figure 1:
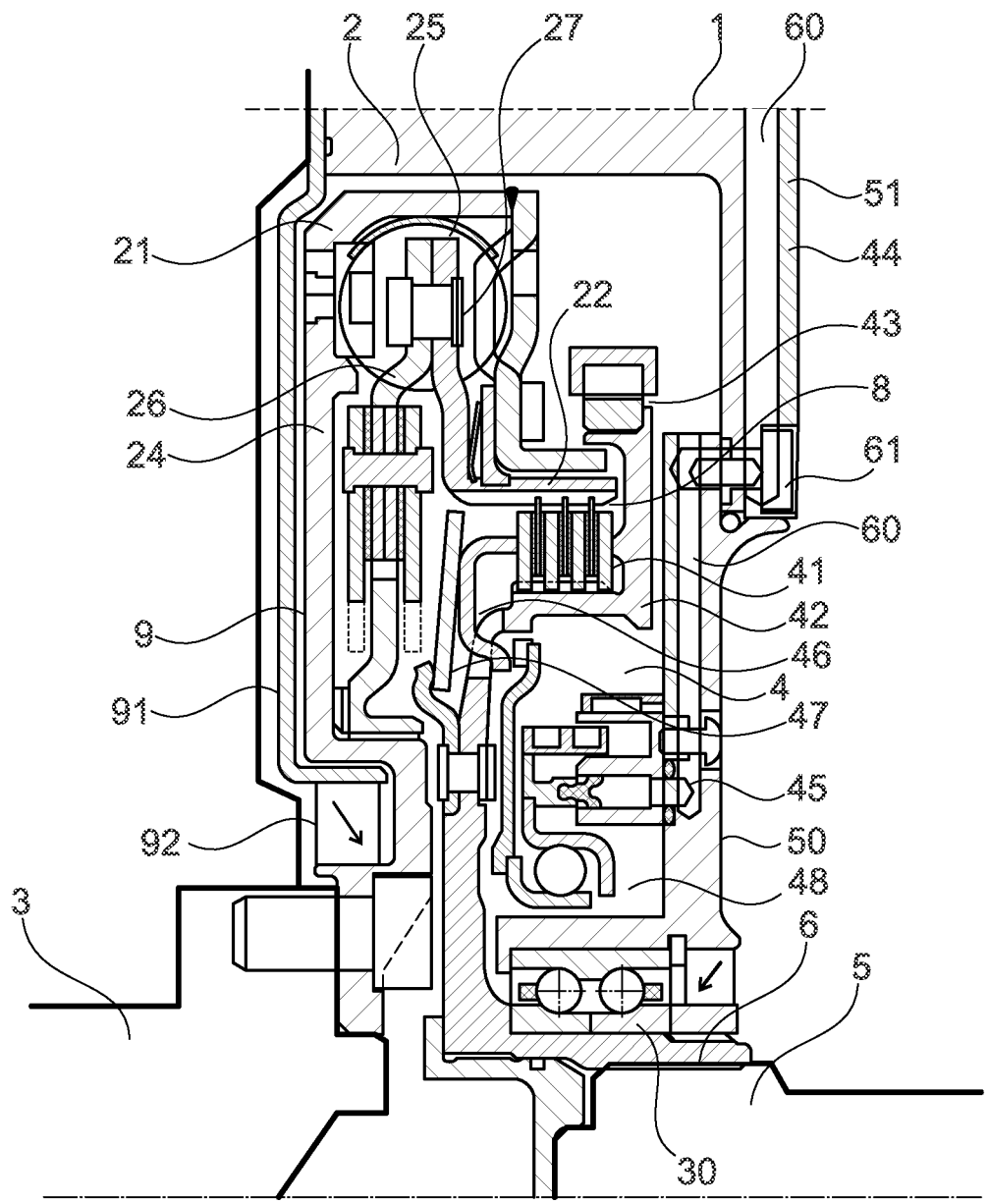
FIG. 1 shows a section through the hybrid module.

A hybrid module 1 according to the disclosure is illustrated in FIG. 1. The motor-side pre-assembly group 2 comprises at least a torsional vibration absorber 21, preferably a dual mass flywheel comprising a primary side, a secondary side and arc springs connecting the primary and secondary side, and a first disk cage 22. A centrifugal pendulum 24 is preferably arranged on the secondary side of the dual mass flywheel. The primary side of the torsional vibration absorber 21 or dual mass flywheel is connected, on the one hand, to the output shaft 3 of the drive motor and, on the other hand, via arc springs 25, to the secondary side of the dual mass flywheel. An outer, first disk cage 22 embodied as a sheet-metal component is arranged on the secondary side. Centrifugal pendulums 24 can additionally be arranged on a second, secondary-side sheet-metal component 26 supported on the primary side, wherein the first and second sheet-metal components can preferably be connected to one another by rivets 27.

The transmission-side pre-assembly group 4, comprising at least one disk pack 41, one second disk cage 42, one wheel 43, one central release mechanism and one module housing 44, is connected to the motor-side pre-assembly group 2 via the disk pack 41 situated between the first and the second disk cage 22, 42. The second disk cage 42 is connected directly to the transmission input shaft 5 via axial splines 6. A wheel 43 for connection of the electric machine 7 (not illustrated in the figure) to the drive train is provided on the disk cage 42 itself.

To actuate the separating clutch 8, which is preferably embodied as "normally closed", comprising a motor-side disk cage 22, disk pack 41 and transmission-side disk cage 42, a central release mechanism 45 arranged on the module housing 44 is provided. In the closed state, the disk pack 41 is clamped against the transmission-side disk cage 42 by means of an actuating lever 46 and an elastic holding means 47, preferably a diaphragm spring, supported on the disk cage. In the case of actuation of the central release mechanism 45, the actuating lever 46 is moved counter to the closing position of the separating clutch 8 by means of a release bearing 48 and, in this way, the power flow is interrupted.

The components can be lubricated by means of an oil bath. For motor-side sealing of the hybrid module, a third pre-assembly group 9, comprising a sealing plate 91 and a sealing ring 92, is therefore provided, wherein the sealing plate 91 is centered on the crankcase 10. The sealing ring 92 is arranged between the sealing plate 91 and the primary side of the dual mass flywheel in such a way that the sealing lips rub on the primary side. The connection of the module housing 44 to the sealing plate 91 can be accomplished by means of a screw joint 93.

The module housing 44 comprises a radially inner housing part 50 and a radially outer housing part 51, which are connected mechanically to one another by means of mechanical fastening devices 61, in particular screwed joints. The radially inner housing part 50 is preferably produced from a steel material and is supported by means of its radial inside on the support bearing 30. The radially outer housing part 51 is preferably produced from a cast aluminum material. At least one flow duct 60 is formed between individual mechanical fastening devices 61 by the two housing parts 50, 51, said duct leading to the central release mechanism 45 and being able to supply the latter with a pressurized fluid.

Figure 2:
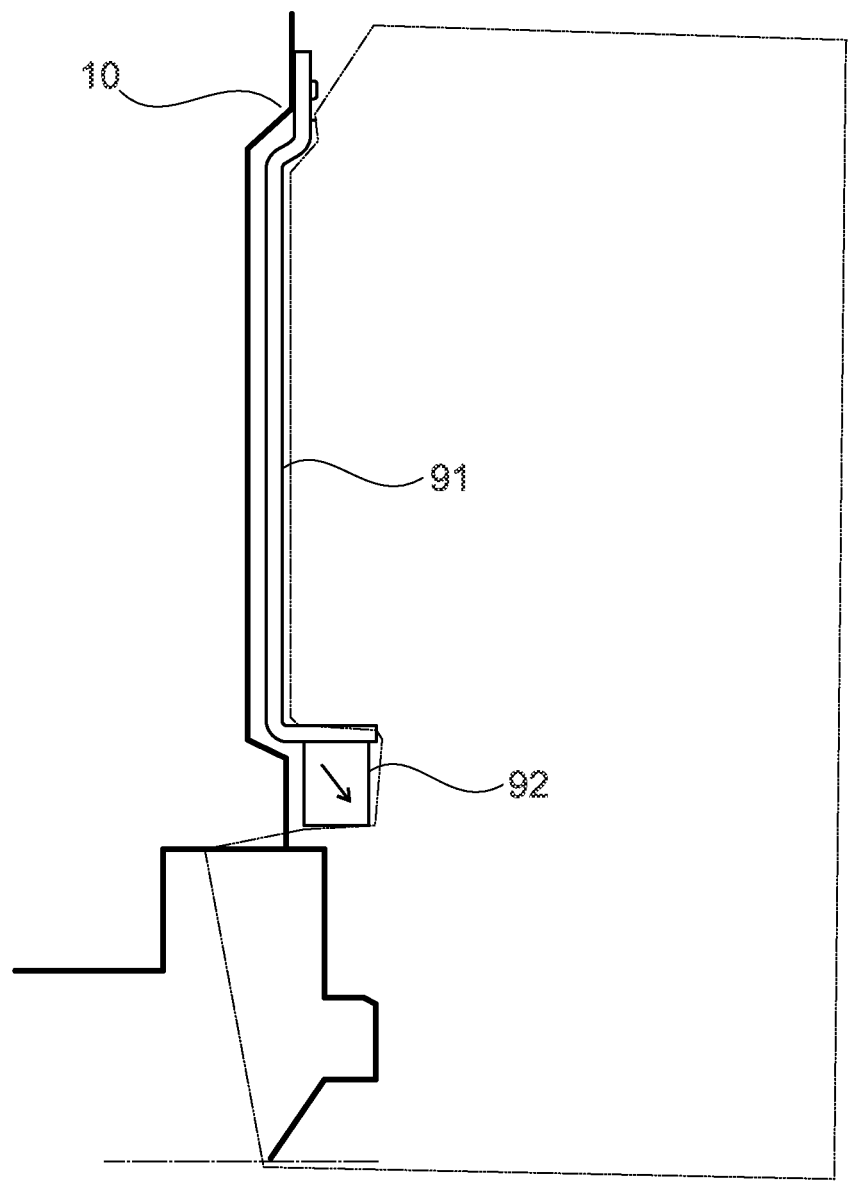
FIG. 2 shows the first assembly step of the hybrid module.

FIG. 2 shows a first assembly step of the hybrid module. In this step, the sealing plate 91 with internal sealing ring 92 defined as the third pre-assembly group 9 is centered on the crankcase 10.

Figure 3:
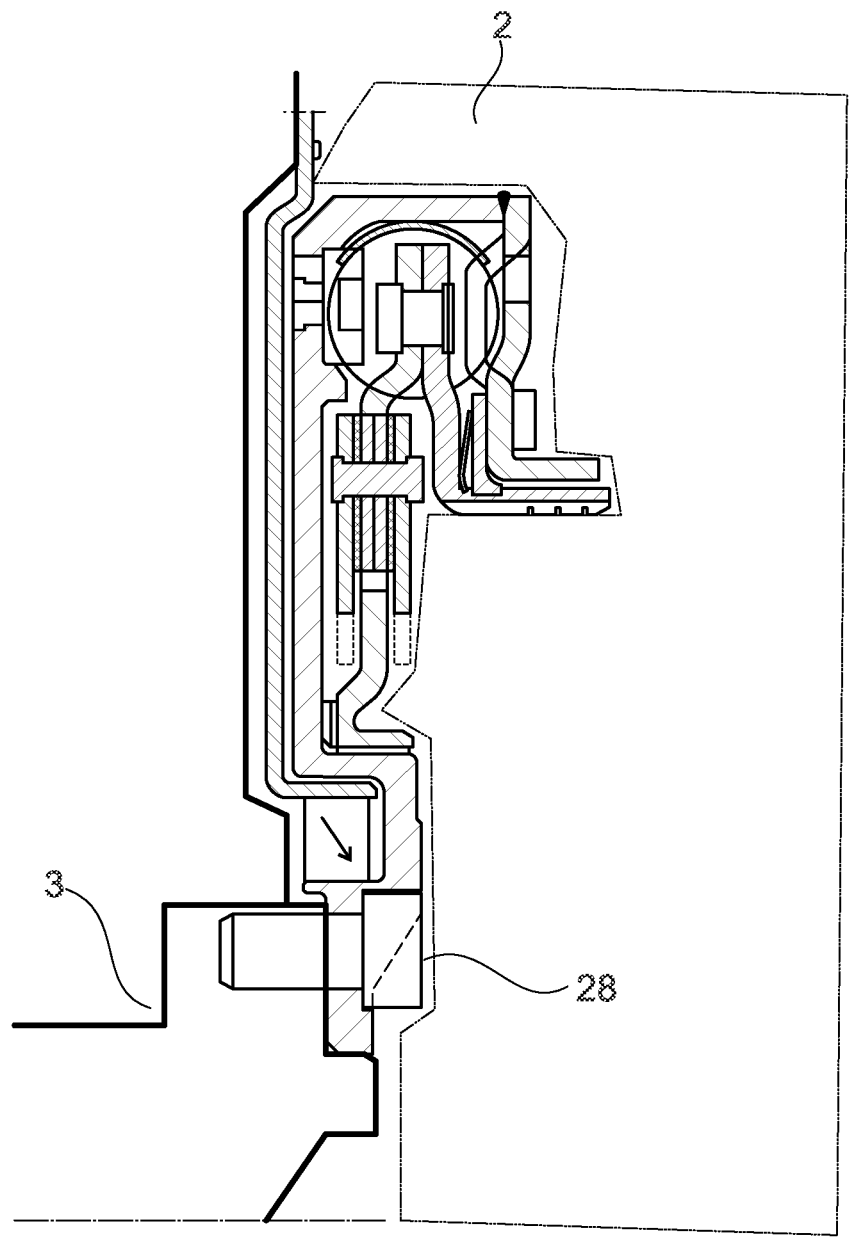
FIG. 3 shows the second assembly step of the hybrid module.

The second assembly step is described in FIG. 3. The motor-side pre-assembly group 2 is mounted axially on the output shaft 3 of the drive motor, centered radially by means of the output shaft 3 and connected to said shaft by means of screw joints 28.

Figure 4:
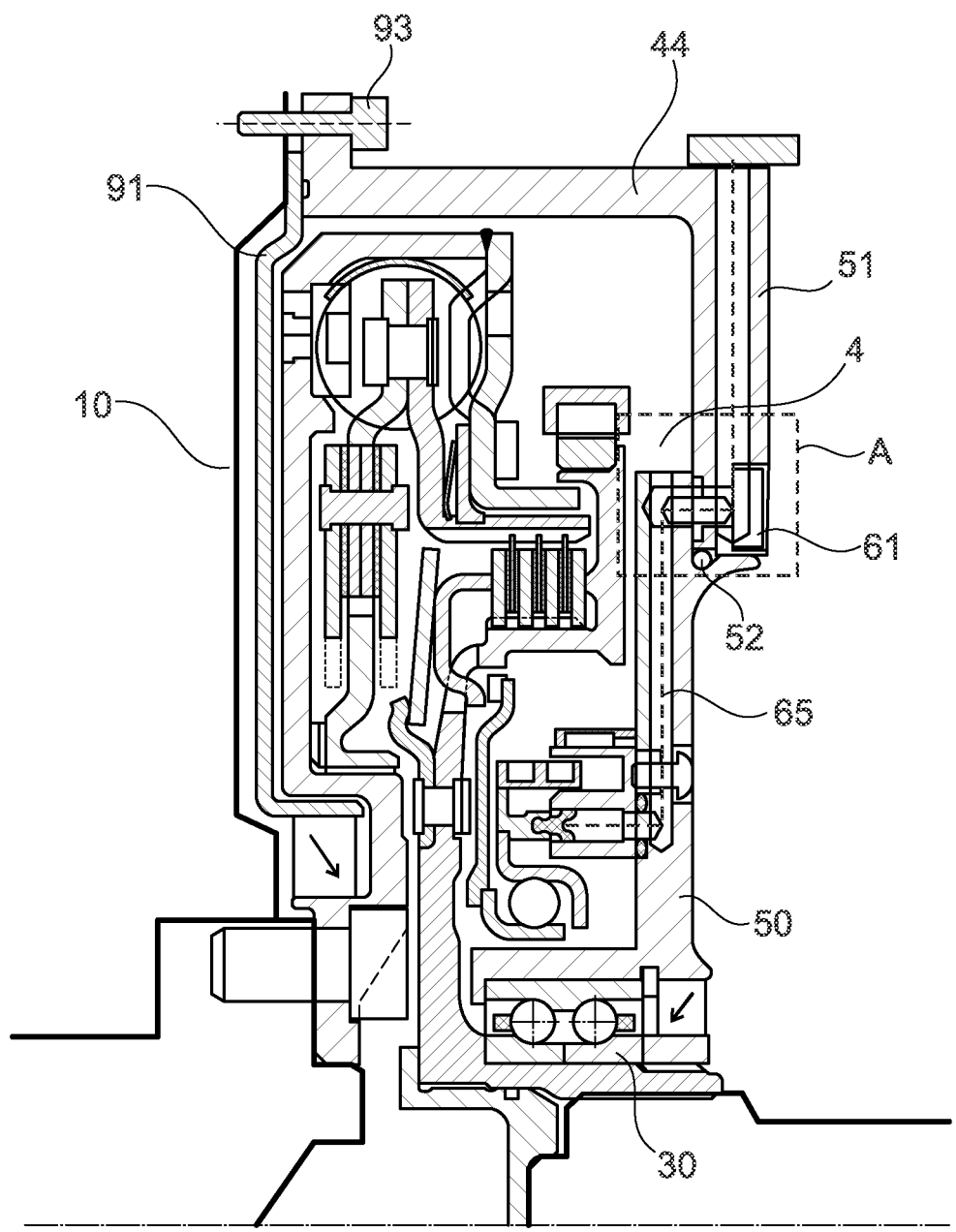
FIG. 4 shows the third assembly step of the hybrid module.

Finally, as shown in FIG. 4, the transmission-side pre-assembly group 4 is mounted axially on the already assembled motor-side pre-assembly group 2, and the module housing 44 is screwed to the sealing plate 91 and to the crankcase 10. In FIG. 4, it can furthermore be seen that the radially outer housing part 51 is connected to the crankcase 10 of an internal combustion engine (not illustrated in detail here) by means of a screw joint 93.

The detail A in the region of the transition between the radially inner housing part 50 and the radially outer housing part 51 is furthermore indicated in FIG. 4. In FIG. 4, the flow path 65 of the fluid fed to the central release mechanism 45 is furthermore represented by the flow duct 60.

Figure 5:
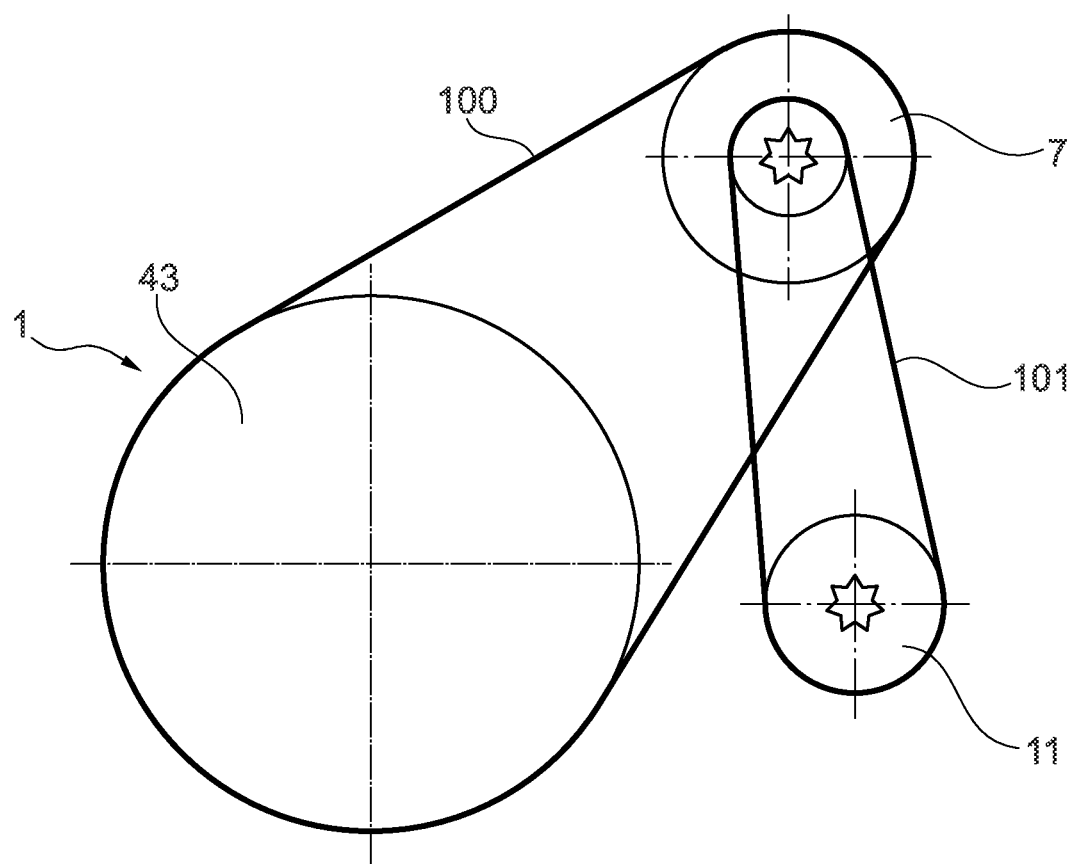
FIG. 5 shows a schematic arrangement of the hybrid module, the electric machine and the air conditioning compressor in a hybrid unit according to the disclosure.

The arrangement of the hybrid module 1, the electric machine 7 and the air conditioning compressor 11 relative to one another in a hybrid system can be seen in FIG. 5. It can be seen that the first flexible transmission means 100 is wrapped around the wheel 43 of the hybrid module 1. A further, second flexible transmission means 101 is provided between the electric machine 7 and the air conditioning compressor 11, in parallel with the arrangement of the first flexible transmission means 100 between the hybrid module 1 and the electric machine 7, thereby also enabling the air-conditioning compressor to be operated by means of the electric machine 7 when the drive motor is stationary.

Figure 6:
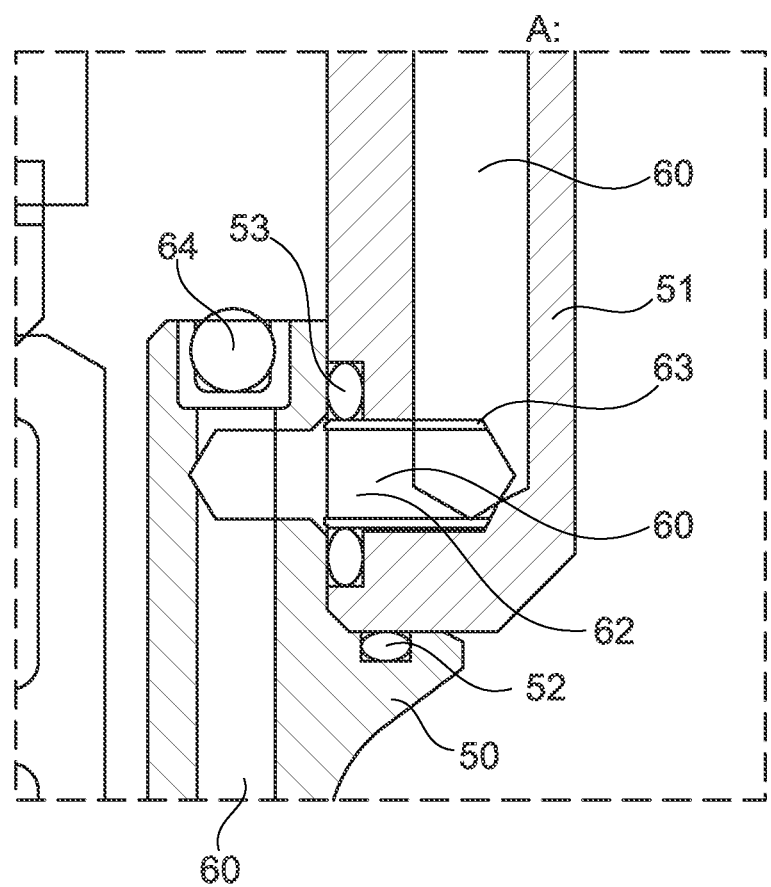
FIG. 6 shows the detail A indicated in FIG. 4 in an enlarged view.

FIG. 6 shows the detail A indicated in FIG. 4 in an enlarged view. The transition between the radially inner housing part 50 and the radially outer housing part 51 is clearly visible here. It can furthermore be seen that the flow duct 60 which is formed in the two housing parts 50, 51 and passes through said parts comprises a transverse hole 62, which connects the radially extending section of the flow duct 60 in the radially outer housing part 51 to the radially extending section of the flow duct 60 in the radially inner housing part 50. A bushing 63 is arranged in the radially outer housing part 51 in order to seal this transverse hole 62. A first O-ring for sealing is arranged between the radially inner housing part 50 and the radially outer housing part 51. A second O-ring is arranged between the bushing 63 and the radially outer housing part 51, said 0-ring developing a sealing action between the bushing 63 and the radially outer housing part 51 and also relative to the radially inner housing part 50. The section of the flow duct 60 which is formed in the radially inner housing part 50 emerges on the radial outside of the radially inner housing part 50. In order to close this section of the flow duct 60, a plug 64 is installed, said plug having an expanding effect owing to elastic restoring forces and in this way closing the section of the flow duct 60 in the radially inner housing part 50 on the radial outside thereof.

With the hybrid module proposed here and with the hybrid unit, as well as the method for the assembly of the hybrid module, a technical solution is made available which allows axially parallel arrangement of a hybrid module in an existing drive train in a flexible manner with the minimum possible installation space.

LIST OF REFERENCE SIGNS 1 hybrid module
2 motor-side pre-assembly group
3 drive shaft
4 transmission-side pre-assembly group
5 transmission input shaft
6 axial splines
7 electric machine
8 separating clutch
9 third pre-assembly group
10 crankcase
11 air-conditioning compressor
21 torsional vibration absorber
22 first disk cage
24 centrifugal pendulum
25 arc spring
26 secondary-side sheet-metal component
27 rivets
28 screw joint
30 support bearing
41 disk pack
42 second disk cage
43 wheel
44 module housing
45 central release mechanism
46 actuating lever
47 elastic holding means
48 release bearing
50 radially inner housing part
51 radially outer housing part
52 first O-ring
53 second O-ring
60 flow duct
61 mechanical fastening device
62 transverse hole
63 bushing
64 plug
91 sealing plate
92 sealing ring
93 screw joint
100 first flexible transmission means
101 second flexible transmission means

The invention claimed is:

1. A hybrid module comprising: a first, motor-side pre-assembly group and a second, transmission-side pre-assembly group, wherein a separating clutch is arranged between the motor-side pre-assembly group and the transmission-side pre-assembly group, via which the pre-assembly groups can be connected in a torque-transmitting manner, wherein:
the motor-side pre-assembly group is formed by at least one torsional vibration absorber and a first disk cage;
the transmission-side pre-assembly group is formed by at least one disk pack, a second disk cage, a wheel, one central release mechanism and one module housing;
the second disk cage is mounted on the support bearing on a housing side and can be connected directly to a transmission-side drive shaft for conjoint rotation therewith; and
the module housing comprises a radially inner housing part and a radially outer housing part, which are connected to one another mechanically, wherein the radially inner housing part is supported on the radial inside thereof on the support bearing, and the radially outer housing part is designed to be connected by at least one mechanical connection to an external device of the internal combustion engine.

2. The hybrid module as claimed in claim 1, wherein the first disk cage is embodied as an outer disk cage, and the second disk cage is embodied as an inner disk cage.

3. The hybrid module as claimed in 1, wherein the radially outer housing part and the radially inner housing part form at least one flow duct, through which a fluid of a clutch actuating device included by the hybrid module can be fed for the purpose of actuating same.

4. The hybrid module as claimed in claim 1, wherein the second disk cage has the wheel by which a connection of an electric machine to a drive train can be achieved.

5. The hybrid module as claimed in claim 1, wherein the separating clutch is designed as a multi-disk clutch.

6. A hybrid unit comprising a hybrid module having a first, motor-side pre-assembly group and a second, transmission-side pre-assembly group, wherein a separating clutch is arranged between the motor-side pre-assembly group and the transmission-side pre-assembly group, via which the pre-assembly groups can be connected in a torque-transmitting manner, and an electric machine axially parallel to an axis of rotation of the hybrid module, and an air-conditioning compressor, which is connected mechanically to the electric machine.

7. The hybrid unit as claimed in claim 6, wherein the hybrid unit furthermore comprises an internal combustion engine, which has a crankcase, and a sealing plate that is centered on the crankcase and has a sealing ring that is provided for the motor-side sealing of the hybrid module.

\* \* \* \* \*